(12) United States Patent
Kitanaka

(10) Patent No.: US 12,311,989 B2
(45) Date of Patent: May 27, 2025

(54) MAINTENANCE MANAGEMENT SYSTEM AND MAINTENANCE MANAGEMENT GROUND SYSTEM

(71) Applicant: Mitsubishi Electric Corporation, Tokyo (JP)

(72) Inventor: Hidetoshi Kitanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/768,505

(22) PCT Filed: Nov. 19, 2019

(86) PCT No.: PCT/JP2019/045294
§ 371 (c)(1),
(2) Date: Apr. 13, 2022

(87) PCT Pub. No.: WO2021/100125
PCT Pub. Date: May 27, 2021

(65) Prior Publication Data
US 2024/0092405 A1      Mar. 21, 2024

(51) Int. Cl.
*B61L 15/00* (2006.01)
*B61L 27/14* (2022.01)
(Continued)

(52) U.S. Cl.
CPC ....... *B61L 15/0081* (2013.01); *B61L 15/0027* (2013.01); *B61L 15/0072* (2013.01);
(Continued)

(58) Field of Classification Search
CPC .................................................. B61L 15/0081
See application file for complete search history.

(56) References Cited

U.S. PATENT DOCUMENTS 7,627,452 B2    12/2009   Albrecht et al.
9,292,011 B2 *   3/2016   Suzuki ................... G05B 15/02
(Continued)

FOREIGN PATENT DOCUMENTS

DE    10261906 A1    6/2003
DE    10331207 A1    1/2005
(Continued)

OTHER PUBLICATIONS

Office Action dated Sep. 7, 2022, issued in corresponding Indian Patent Application No. 202227027208, 7 pages.
(Continued)

*Primary Examiner* — Michael A Berns
(74) *Attorney, Agent, or Firm* — Buchanan Ingersoll & Rooney PC

(57) ABSTRACT

A maintenance management ground system includes a data management unit and a determination unit. The data management unit holds and manages information on the life of a part to be installed on a railroad car. The determination unit determines whether it is necessary to replace a first part with a new replacement part within a period in which a periodic inspection of the railroad car is performed, on the basis of the life information, and information on a scheduled carrying-in date and a scheduled carrying-out date. The scheduled carrying-in date is a date on which the railroad car is to be carried into an implementation site where the periodic inspection is performed. The scheduled carrying-out date is a date on which the railroad car is to be carried out of the implementation site. The first part is expected to reach the end of its life after the scheduled carrying-out date.

16 Claims, 5 Drawing Sheets

(51) Int. Cl.
  *G06Q 10/083*      (2023.01)
  *G06Q 10/0875*     (2023.01)
(52) U.S. Cl.
  CPC ............ *B61L 27/14* (2022.01); *G06Q 10/083* (2013.01); *G06Q 10/0875* (2013.01)

(56) References Cited

U.S. PATENT DOCUMENTS

| | | |
|---|---|---|
| 9,630,636 B2 | 4/2017 | Fischer et al. |
| 10,131,369 B2 | 11/2018 | Fischer et al. |
| 2007/0035901 A1 | 2/2007 | Albrecht et al. |
| 2014/0052299 A1 | 2/2014 | Suzuki et al. |
| 2015/0247781 A1 | 9/2015 | Fischer et al. |
| 2015/0251677 A1 | 9/2015 | Fischer et al. |
| 2019/0011506 A1 | 1/2019 | Kobayashi et al. |

FOREIGN PATENT DOCUMENTS

| | | |
|---|---|---|
| DE | 102013201494 A1 | 3/2014 |
| DE | 112016006264 T5 | 9/2018 |
| DE | 102017111901 A1 | 12/2018 |
| JP | H06201680 A | 7/1994 |
| JP | H09243518 A | 9/1997 |
| JP | 2002209303 A | 7/2002 |
| JP | 2009054190 A | 3/2009 |
| JP | 2017225342 A | 12/2017 |
| JP | 2018136877 A * | 8/2018 |

OTHER PUBLICATIONS

International Search Report (PCT/ISA/210) with English translation and Written Opinion (PCT/ISA/237) mailed on Feb. 10, 2020, by the Japan Patent Office as the International Searching Authority for International Application No. PCT/JP2019/045294.

Notification of Reason for Refusal of JP Patent Application No. 2021-558079, dated Jan. 25, 2022.

Office Action dated Oct. 17, 2024, issued in the corresponding German Patent Application No. 11 2019 007 902.6, 10 pages including 5 pages of English Translation.

* cited by examiner

MAINTENANCE MANAGEMENT SYSTEM AND MAINTENANCE MANAGEMENT GROUND SYSTEM

FIELD

The present invention relates to a maintenance management system for railroad cars and a maintenance management ground system which is a ground system of the maintenance management system.

BACKGROUND

A railroad car is equipped with parts such as a brake shoe, a bearing, a rubber packing, a filter, and an insulator. These parts are consumable parts that cannot deliver desired performance due to wear, deformation, defacement, deterioration in insulation performance, or the like according to aging or a travel distance. In order to stably operate railroad cars, these parts are replaced before the performance deteriorates.

Patent Literature 1 below discloses a maintenance service system. The maintenance service system of Patent Literature 1 determines whether operating time of a part or the number of times the part has operated is within guaranteed time or a guaranteed number of times, respectively. When the part reaches a replacement criterion level, the maintenance service system issues instructions for taking the part out of storage and conducting the replacement.

CITATION LIST

Patent Literature

Patent Literature 1: Japanese Patent Application Laid-open No. 2009-54190

SUMMARY

Technical Problem

However, the degree of wear and tear or deterioration of a part varies under various conditions such as operating routes, environmental conditions, and temperatures. In a case where the replacement criterion level is uniformly determined, therefore, it is necessary to adopt the strictest one of various conditions so as to perform smooth maintenance service. Meanwhile, in a case where a railroad car is operated under a relatively loose condition, it is also conceivable that the degree of wear and tear or deterioration of the part may be low even if the part has reached the replacement criterion level. A problem arising in such a case is that replacing the part with a new replacement part increases the number of parts used and the number of parts in stock, which leads to an increase in maintenance cost.

The present invention has been made in view of the above, and an object of the present invention is to obtain a maintenance management ground system capable of performing smooth maintenance service while preventing an increase in maintenance cost.

Solution to Problem

In order to solve the above-described problem and achieve the object, a maintenance management ground system according to the present invention comprises a data management unit and a determination unit. The data management unit holds and manages life information, the life information being information on a life of a part to be installed on a railroad car. The determination unit determines whether it is necessary to replace a first part with a new replacement part within a period in which a periodic inspection of the railroad car is performed, on a basis of the life information and carrying-in and carrying-out information, the carrying-in and carrying-out information being information on a scheduled carrying-in date and a scheduled carrying-out date, the scheduled carrying-in date being a date on which the railroad car is to be carried into an implementation site where the periodic inspection is performed, the scheduled carrying-out date being a date on which the railroad car is to be carried out of the implementation site, the first part being expected to reach an end of life thereof after the scheduled carrying-out date.

Advantageous Effects of Invention

The maintenance management ground system according to the present invention has the effect of enabling smooth maintenance service to be performed while preventing an increase in maintenance cost.

DESCRIPTION OF EMBODIMENTS

Hereinafter, a maintenance management system and a maintenance management ground system according to an embodiment of the present invention will be described in detail with reference to the accompanying drawings. Note that the present invention is not limited to the following embodiment.

Embodiment

Figure 1:
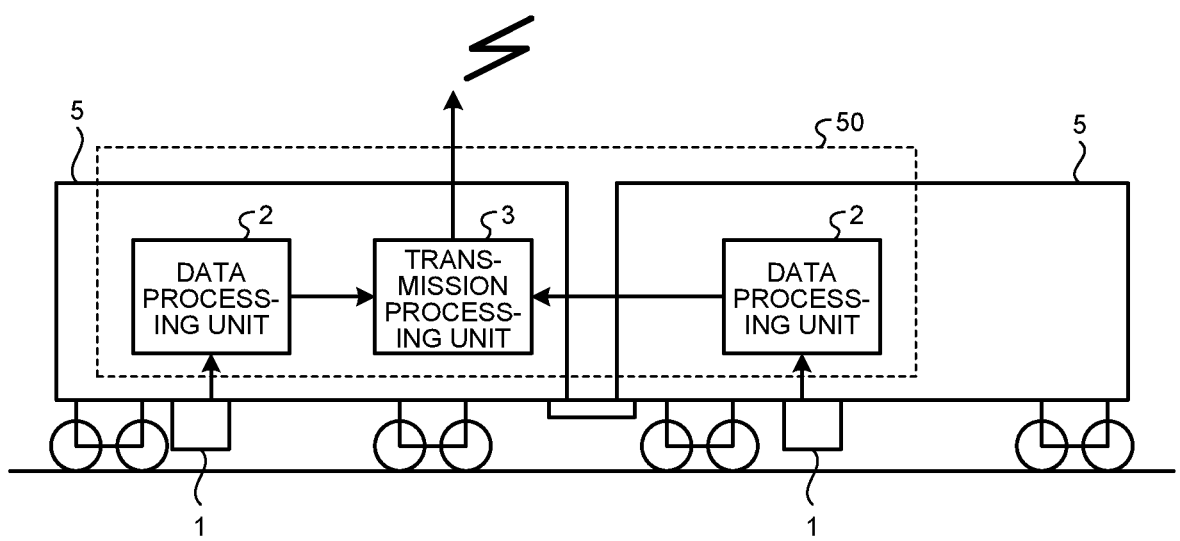
FIG. 1 is a diagram illustrating a configuration example of a train car system in the present embodiment.
Figure 2:
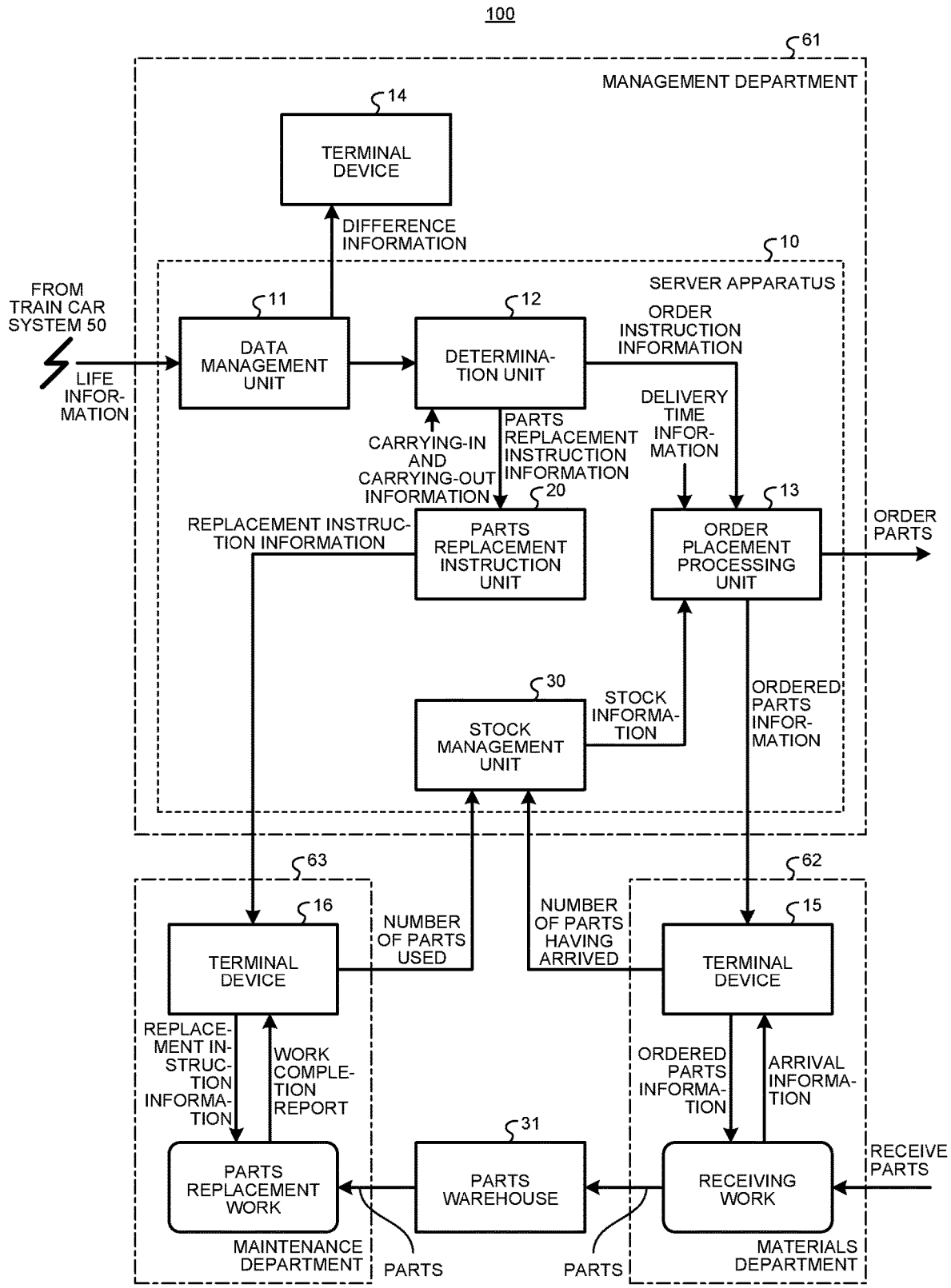
FIG. 2 is a diagram illustrating a configuration example of a maintenance management ground system in the present embodiment.

First, a configuration of a maintenance management system (hereinafter, simply referred to as a "maintenance management system") for railroad cars according to the present embodiment will be described with reference to FIGS. 1 and 2. FIG. 1 is a diagram illustrating a configuration example of a train car system 50 in the present embodiment. FIG. 2 is a diagram illustrating a configuration example of a maintenance management ground system 100 in the present embodiment. The maintenance management system according to the present embodiment includes the train car system 50 and the maintenance management ground system 100.

As illustrated in FIG. 1, the train car system 50 includes data processing units 2 and a transmission processing unit 3. Each element of the train car system 50 is installed on a railroad car (hereinafter, simply referred to as a "car") 5. A detector 1 is provided under the floor of the car 5. The detector 1 is a device that detects the degree of wear and tear on consumable parts used in the car 5. FIG. 1 illustrates an example in which a single train set includes two cars 5, each of which is equipped with a single detector 1. However, the configuration of the present invention is not limited to this example. Each car 5 may be equipped with two or more detectors 1. In addition, a single train set may include a single car, or may include three or more cars. Note that, in the following description, a group of cars of a single train set including a plurality of the cars 5 is referred to as a "train" where appropriate.

Examples of the consumable parts include a brake shoe, a rubber packing, a bearing, an air filter, an oil filter, and various insulators. The detector 1 detects the degree of wear and tear on the brake shoe, the degree of deterioration of the rubber packing, the degree of wear on the bearing, the degree of clogging or defacement of the air filter and the oil filter, the degree of deterioration of the insulator, and the like. Note that details of the detection method will be described below with a brake shoe as an example. In addition, the consumable parts described herein are examples, and targets to be detected by the detector 1 is not limited to these examples.

The result of detection performed by the detector 1 is transmitted to the data processing unit 2. On the basis of the result of detection performed by the detector 1, the data processing unit 2 generates life information that is information on the life of a part. Details of the life information will be described below.

The life information is transmitted to the transmission processing unit 3. The transmission processing unit 3 aggregates the life information, and transmits the aggregated life information to the maintenance management ground system 100 that is a ground-side system of the maintenance management system.

As illustrated in FIG. 2, the maintenance management ground system 100 is a computer system including a server apparatus 10 and terminal devices 14, 15, and 16. The server apparatus 10 includes a data management unit 11, a determination unit 12, an order placement processing unit 13, a parts replacement instruction unit 20, and a stock management unit 30.

FIG. 2 illustrates an example in which the maintenance management ground system 100 is used in three departments, i.e., a management department 61, a materials department 62, and a maintenance department 63. Specifically, the server apparatus 10 and the terminal device 14 are used in the management department 61. The terminal device 15 is used in the materials department 62. The terminal device 16 is used in the maintenance department 63.

The management department 61 is a department that manages maintenance of the car 5. FIG. 2 illustrates an example in which the management department 61 also orders parts. The materials department 62 is a department that receives ordered parts. The received parts are stored in a parts warehouse 31. The maintenance department 63 is a department that performs parts replacement work. The parts replacement work is performed using parts stored in the parts warehouse 31. Detailed operation in each department will be described below.

Note that the classification of departments and the name of each department in FIG. 2 are examples, and the classification of departments and the name of each department are not limited to these examples. Other departments or departments with other names may use the maintenance management ground system 100. In addition, although FIG. 2 illustrates each department having a single terminal device, each department may have a plurality of terminal devices. Alternatively, a plurality of departments may share a single terminal device.

Figure 3:
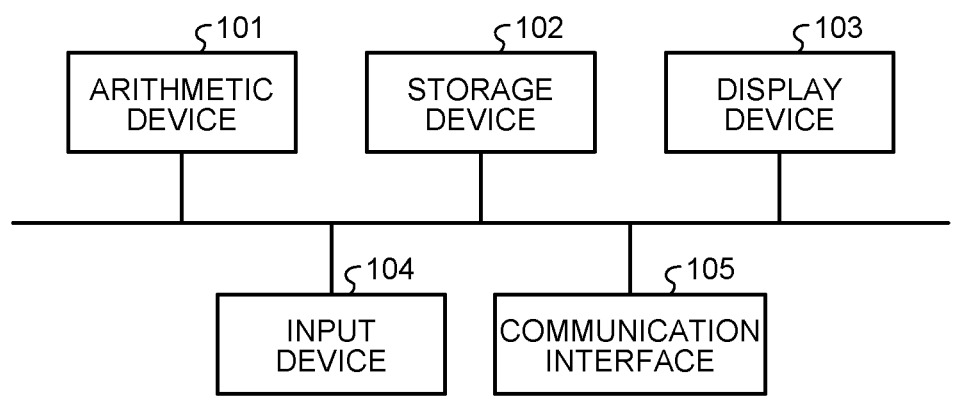
FIG. 3 is a diagram illustrating an example of a hardware configuration that implements a server apparatus in the present embodiment.

Next, hardware that implements the functions of the server apparatus 10 will be described. FIG. 3 is a diagram illustrating an example of a hardware configuration that implements the server apparatus 10 in the present embodiment.

Functions in the server apparatus 10 and data transmission and data reception to be performed between the train car system 50 and the terminal device 14 can be implemented by, for example, an arithmetic device 101, a storage device 102, a display device 103, an input device 104, and a communication interface 105 illustrated in FIG. 3.

The arithmetic device 101 is a central processing unit (CPU). The arithmetic device 101 may be something called a central processing unit, a processing unit, a processor, a microprocessor, a microcomputer, or a digital signal processor (DSP).

The storage device 102 is a nonvolatile or volatile semiconductor memory, a hard disk, or the like. Examples of the nonvolatile or volatile semiconductor memory include a random access memory (RAM), a read only memory (ROM), a flash memory, an erasable programmable read only memory (EPROM), and an electrically erasable programmable read only memory (EEPROM) (registered trademark).

The display device 103 is a liquid crystal monitor, a display, or the like. The input device 104 is a keyboard, a mouse, or the like. The communication interface 105 is, for example, a network interface card (NIC).

The storage device 102 stores a program for executing the functions of the server apparatus 10 in the present embodiment, data generated by the server apparatus 10, and a database managed by the server apparatus 10. The arithmetic device 101 executes the program stored in the storage device 102. A result of calculation performed by the arithmetic device 101 and information processed or generated by the arithmetic device 101 are stored in the storage device 102. The storage device 102 also holds information received from the train car system 50 via the communication interface 105, information exchanged with the terminal devices 14, 15, and 16, and the like. The program and data held in the server apparatus 10 are managed by an administrator of the server apparatus 10 by use of the display device 103 and the input device 104.

The terminal devices 14, 15, and 16 can also be implemented by a hardware configuration similar to that in FIG. 3. A user in each department can check or input information and data necessary for operations of each department by using each terminal device. Note that the terminal devices 14, 15, and 16 need not be dedicated devices, and may be general-purpose devices having a wireless communication function, such as a personal computer, a tablet terminal, and a smartphone.

Figure 4:
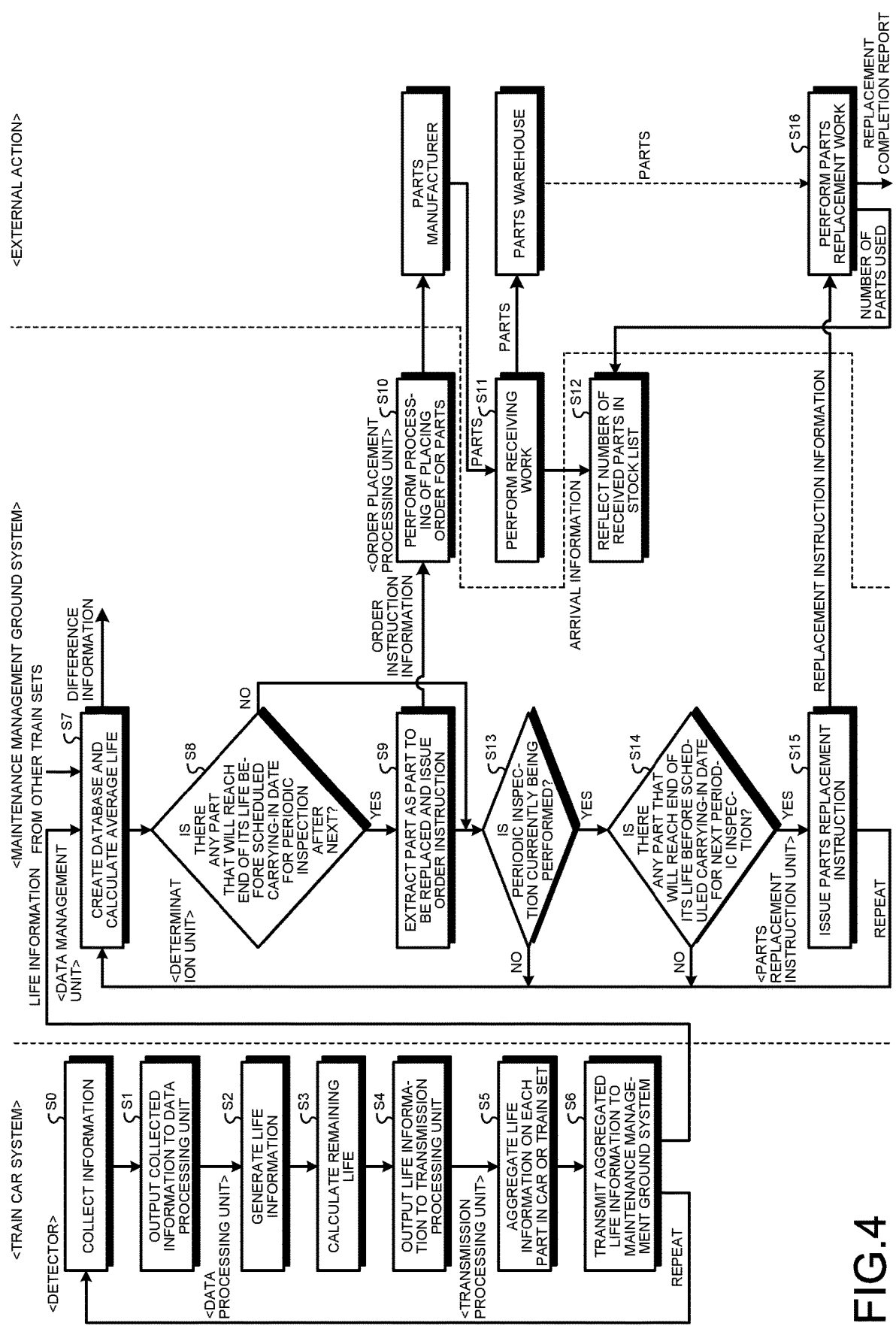
FIG. 4 is a flowchart to be used to describe operation of a maintenance management system according to the present embodiment.

Next, operation of the maintenance management system according to the present embodiment will be described. FIG. 4 is a flowchart to be used to describe operation of the maintenance management system according to the present embodiment. Note that, for easy understanding, a brake shoe will be described as an example of a part in a process to be performed by the train car system 50.

The brake shoe is an alloy formed of cast iron. The brake shoe is a part that is pressed against a wheel tread by air pressure and oil pressure. Alternatively, the brake shoe is a part that generates a frictional force by sandwiching a brake disc mechanically coupled to a wheel and exerts a braking force on the car 5.

In many cases, the car 5 is equipped with a regenerative brake separately from a brake mechanism using a brake shoe. However, the performance of the regenerative brake is not sufficient to rapidly decelerate the car from high speed. For this reason, the brake mechanism using the brake shoe is an essential element in the car 5. As described above, the brake shoe is an important part that gives sufficient braking force to the car 5 under conditions where the regenerative brake does not sufficiently function.

In principle, the brake shoe wears with use. Specifically, the greater a frictional force to be generated and the longer the time during which the frictional force is generated, the larger the amount of wear on the brake shoe. In other words, the greater a brake force and the longer the time during which a brake is applied, the larger the amount of wear on the brake shoe. Meanwhile, the car 5 runs under various conditions. Thus, there are cases where brakes are applied more frequently in, for example, a local train that stops at every station and a train running on a route with a gradient. In addition, there are cases where brakes are applied less frequently in, for example, a limited express train on a flat route. Furthermore, some car 5 is equipped with a regenerative brake, and some is not. The amount of wear on the brake shoe therefore varies from car 5 to car 5. For these reasons, the detector 1 collects information on the amount of wear on the brake shoe for each car 5 or each wheel (step S0).

Note that the amount of wear on the brake shoe may be measured by use of a method of directly detecting and outputting the thickness of the brake shoe. Alternatively, it is also possible to use a method of outputting an estimate of the amount of wear on the brake shoe on the basis of the magnitude of air pressure and the time during which the air pressure is applied. In addition, other methods may be used.

The information on the amount of wear on the brake shoe collected by the detector 1 is output to the data processing unit 2 (step S1).

The data processing unit 2 generates life information on the basis of the information from the detector 1 (step S2). The life information is information for estimating the state of deterioration of a part. Specifically, an example of the life information is a ratio of the thickness of the current brake shoe to the thickness of a brand-new brake shoe. Instead of this, the thickness itself of the current brake shoe may be used as the life information. Another example of the life information is the product of the magnitude of air pressure and the time during which the air pressure is applied. Alternatively, a ratio of the product of the magnitude of air pressure and the time during which the air pressure is applied to a comparison value, or the like may be used as the life information. Note that in addition to these pieces of life information, it is desirable that there be information indicating a remaining life that represents the approximate number of days for which the brake shoe can be used, assuming that the brake shoe is continuously used. For this reason, the data processing unit 2 calculates the remaining life of the brake shoe by using the life information (step S3). Note that, for ease of description, the following description is based on the assumption that the remaining life is included in the life information. The data processing unit 2 outputs the life information to the transmission processing unit 3 (step S4).

The transmission processing unit 3 aggregates the life information on each part transmitted from a plurality of the data processing units 2 in the cars or the train set (step S5), and transmits the aggregated life information to the maintenance management ground system 100 on the ground side (step S6). Thereafter, the processing from step S1 to step S6 is repeated. In addition, the processing of step S7 and subsequent steps is performed simultaneously in parallel to the processing of step 1 to step 6.

The life information transmitted from the train car system 50 is input to and held in the data management unit 11 of the maintenance management ground system 100. Not only life information transmitted from the transmission processing unit 3 of a single train set but also pieces of life information transmitted from the transmission processing units 3 of other train sets are input to the data management unit 11. The data management unit 11 creates a database on the basis of the pieces of life information from the plurality of train sets, and manages the created data (step S7). The database preferably includes a train number, a car number, reception time, a device name, and a part name in addition to the life information. Furthermore, the data management unit 11 calculates the average life of each part, and holds the average life in the database (step S7). The average life may be calculated when the life information is received, or may be calculated when the reception processing is not performed.

The data management unit 11 compares the received life information with the average life held in the database. When the difference therebetween is equal to or greater than a determination value, the data management unit 11 generates difference information (step S7). The difference information is information generated, for example, when there is a difference between the amount of wear on a brake shoe of a certain car and an average value as a result of comparison, that is, when the difference between the amount of wear and an average value for parts of the same type is significant. This difference information can be seen using the terminal devices 14, 15, and 16. When the difference information is generated, the generated difference information may be forcibly output to the terminal device 16 of the maintenance department. It is thus possible to promptly inform a person in charge of maintenance that there is an excessive amount of wear on the brake shoe. In addition, the person in charge of maintenance can determine, from the tendency of the difference information, that an increase in the amount of wear on the brake shoe is due to an anomaly in the car, such as excessive air pressure. As a result, the person in charge of maintenance can quickly take measures to reduce the amount of wear on the brake shoe.

The life information received by the data management unit 11 is output to the determination unit 12 in the subsequent stage (step S7). In addition to the life information, carrying-in and carrying-out information is input to the determination unit 12 (see FIG. 2). The carrying-in and carrying-out information includes train information, scheduled carrying-in date information, scheduled carrying-out date information, return-to-operation information, and the like. The train information is information on a train number and a train set regarding a train on which a periodic inspection is performed. The scheduled carrying-in date information is information regarding a scheduled date on which the train is to be carried into an implementation site where the periodic inspection is performed. The scheduled carrying-out date information is information regarding a scheduled date on which the train is to be carried out of the implementation site where the periodic inspection is performed. The return-to-operation information is information regarding a scheduled date on which the train is to return to commercial operation after the periodic inspection is completed. The periodic inspection is performed in accordance with a plan set in advance.

Figure 5:
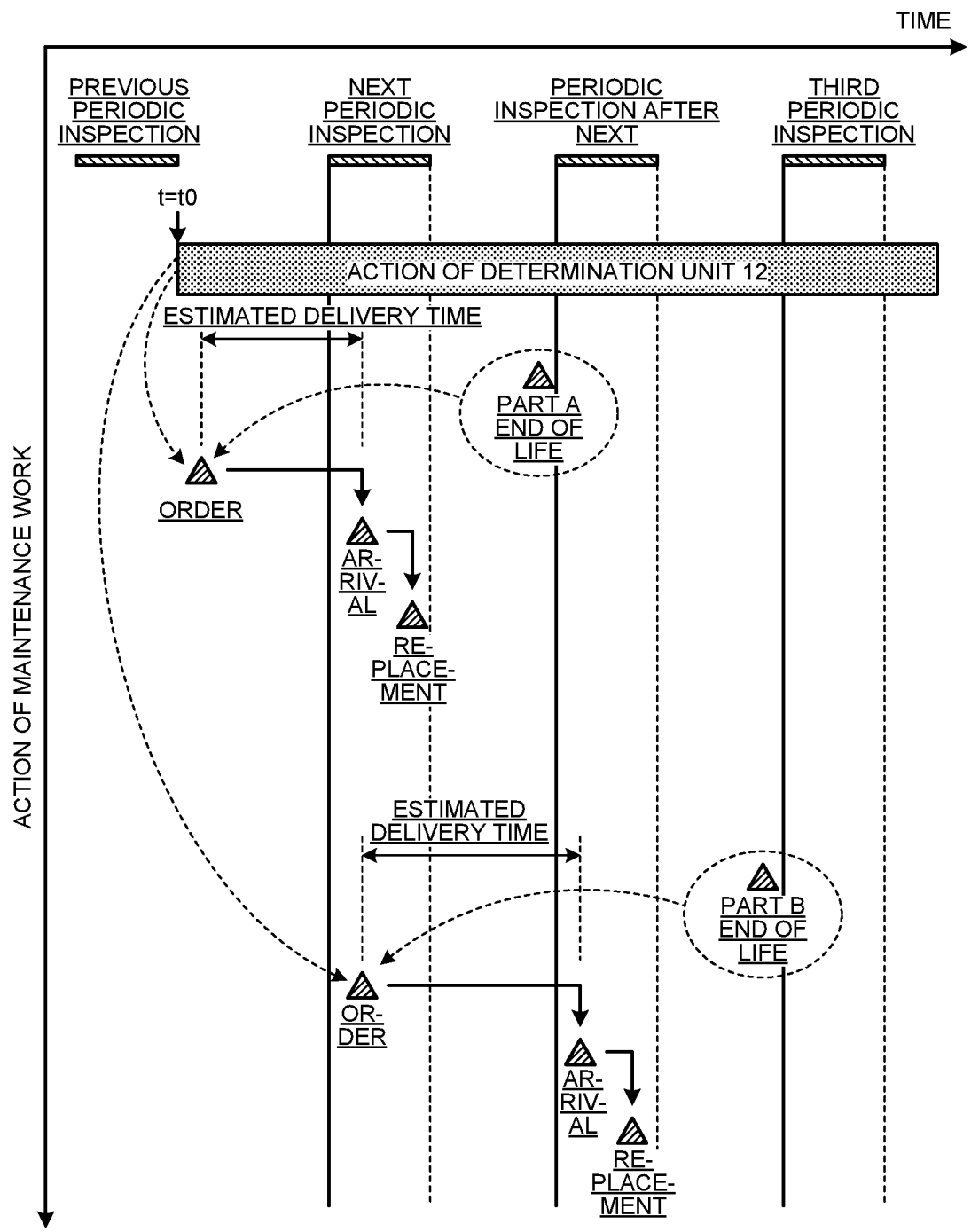
FIG. 5 is a timing diagram to be used to describe the operation of the maintenance management system according to the present embodiment.

For easy understanding of the processing of step S8 and subsequent steps in FIG. 4, description of FIG. 5 will be provided first. FIG. 5 is a timing diagram to be used to describe the operation of the maintenance management system according to the present embodiment. In FIG. 5, the horizontal axis represents time, and the vertical axis represents action of maintenance work.

FIG. 5 illustrates the scheduling of periodic inspections along the time axis. The "previous periodic inspection" refers to a periodic inspection that has already been performed. The "next periodic inspection", the "periodic inspection after next", and the "third periodic inspection" that follows the "periodic inspection after next" are periodic inspections scheduled in the future. The left end of each hatched rectangle represents a scheduled carrying-in date, and the right end of each hatched rectangle represents a scheduled carrying-out date. In addition, assuming that the current time t is "t0", the determination unit 12 operates constantly at and after time to.

FIG. 5 illustrates a part A that is expected to reach the end of its life before a scheduled carrying-in date for the periodic inspection after next. When such a part A exists, the determination unit 12 performs order placement processing for the part A on the basis of an estimated delivery time that spans a delivery time forward from a deadline, so as to enable replacement work for the part A to be performed at the time of the next periodic inspection.

In addition, FIG. 5 illustrates a part B that is expected to reach the end of its life before a scheduled carrying-in date for the third periodic inspection. This determination is also performed at time t0. When such a part B exists, the determination unit 12 determines a periodic inspection during which replacement work for the part B is to be performed, taking an estimated delivery time into consideration. In the example of FIG. 5, the estimated delivery time for the part B is short. Therefore, the replacement work can be performed during either the next periodic inspection or the periodic inspection after next. In such a case, order placement processing for the part B is performed such that the replacement work is performed at the time of the periodic inspection after next. This enables the order placement processing for the part B to be delayed, so that the current part B can be used for a longer time within its lifetime. As a result, the overall number of the parts B used can be reduced, and an increase in maintenance cost can be prevented.

Reference is made back to FIG. 4. The determination unit 12 determines whether there is any part that will reach the end of its life before the scheduled carrying-in date for the periodic inspection after next (step S8). When there is no corresponding part (step S8, No), the process proceeds to step S13. When there is a corresponding part (step S8, Yes), the determination unit 12 extracts the part as a part to be replaced, and issues an order instruction (step S9). Specifically, the determination unit 12 transmits order instruction information to the order placement processing unit 13. After the processing of step S9, the processing of steps S10 to S12 and the processing of step S13 and subsequent steps are performed in parallel.

In addition to the order instruction information transmitted from the determination unit 12, delivery time information regarding the part is also input to the order placement processing unit 13. The order placement processing unit 13 performs processing of placing an order for the part with a parts manufacturer on the basis of the order instruction information and the delivery time information (step S10). For example, assume that the part will be delivered 30 days after. In this case, order placement processing is performed at least 30 days before a scheduled replacement date on which the part is to be replaced during a period in which a periodic inspection is performed, so as to enable the part to be delivered by the data of the replacement of the part. The order placement processing unit 13 outputs ordered parts information to the terminal device 15 of the materials department 62. Note that when performing order placement processing, the order placement processing unit 13 may acquire stock information regarding the ordered part from a stock list managed by the stock management unit 30, and perform order placement processing on the basis of the acquired stock information. For example, if the parts in stock are not parts ordered for replacement at the time of a periodic inspection, but are parts acquired as spare parts, these spare parts in stock may be utilized. This enables the parts in stock to be effectively utilized.

When the parts are delivered from the parts manufacturer, receiving work is performed in the materials department 62 (step S11). The received parts are stored in the parts warehouse 31. In addition, when the parts are received, arrival information on the parts is input to the terminal device 15, and an arrival number, which is the number of the parts having arrived, is reflected in the stock list (step S12).

After the processing in step S9, the determination unit 12 determines whether a periodic inspection is currently being performed (step S13). If no periodic inspection is being performed (step S13, No), the process returns to step S7, and the processing in and after step S7 is repeated. Meanwhile, if a periodic inspection is being performed (step S13, Yes), the determination unit 12 determines whether there is any part that will reach the end of its life before a scheduled carrying-in date for the next periodic inspection (step S14). When there is no corresponding part (step S14, No), the process returns to step S7, and the processing in and after step S7 is repeated. Meanwhile, when there is a corresponding part (step S14, Yes), the determination unit 12 issues a parts replacement instruction to the parts replacement instruction unit 20 so as to replace the part (step S15). Specifically, the determination unit 12 outputs parts replacement instruction information to the parts replacement instruction unit 20. After the processing of step S15, the processing of step S16 and the processing of repeating the processing in and after step S7 are performed in parallel to each other.

The parts replacement instruction unit 20 outputs, to the terminal device 16 of the maintenance department 63, replacement instruction information generated on the basis of the parts replacement instruction information. The replacement instruction information, which is information necessary for parts replacement work, includes at least information on a replacement part name, a device name, a car number, a replacement date, and the number of parts. The maintenance department 63 can obtain instruction and information on parts replacement through the terminal device 16. As a result, parts replacement work is performed (step S16). When the replacement work is completed, a work completion report is made using the terminal device 16, and the number of parts used is reflected in the stock list.

An example of the operation of the maintenance management system according to the present embodiment has been described above. In order to facilitate understanding, a periodic inspection scheduled to be performed have been described as being divided into three inspections, i.e., the "next periodic inspection", the "periodic inspection after next", and the "third periodic inspection" in FIGS. 4 and 5. It is noted that dividing the scheduled periodic inspection in this way is not essential. The following is operation of the maintenance management system not based on the scheduled periodic inspection divided in such a manner.

The determination unit 12 determines whether it is necessary to replace a first part with a new replacement part within a period in which a certain periodic inspection is performed. The first part is expected to reach the end of its life after a scheduled carrying-out date for the certain periodic inspection. Assuming that the "certain periodic inspection" mentioned here is the "next periodic inspection" in FIG. 5, the "part A" in FIG. 5 is a part expected to reach the end of its life after a scheduled carrying-out date for the "next periodic inspection". Therefore, the "first part" mentioned here is the "part A". In addition, assuming that the "certain periodic inspection" mentioned here is the "periodic inspection after next" in FIG. 5, the "part B" in FIG. 5 is a part expected to reach the end of its life after a scheduled carrying-out date for the "periodic inspection after next". Therefore, the "first part" mentioned here is the "part B".

Note that, in FIG. 5, in a case where an estimated delivery time for the part A is long, it is conceivable that there may be a case where even if an order is placed at the time of determination, an ordered part is not delivered in time for the next periodic inspection. However, if the above-described maintenance management system is continuously used, sufficient time is secured before delivery of parts in most cases as in the order placement processing for the parts A and B illustrated in FIG. 5. Therefore, it can be considered that such a case as failure to deliver an ordered part by the next periodic inspection seldom arises. In addition, it goes without saying that even in the case where an ordered part is not delivered in time for the next periodic inspection, it is possible to deal with such a case by carrying the part in stock.

As described above, according to the present embodiment, the determination unit determines whether it is necessary to replace a first part with a new replacement part within a period in which a periodic inspection is performed, on the basis of the life information and the carrying-in and carrying-out information. The first part is expected to reach the end of its life after a scheduled carrying-out date on which a train is to be carried out of an implementation site where the periodic inspection is performed. As a result, the first part can be used for a longer time within its lifetime, so that the overall number of the first parts used can be reduced. As a result, it is possible to perform smooth maintenance service while preventing an increase in maintenance cost.

Furthermore, according to the present embodiment, the order placement processing unit further performs order placement processing for a replacement part on the basis of delivery time estimate information that estimates a delivery time of the replacement part. In addition, the order placement processing unit performs order placement processing for a replacement part such that the first part can be replaced with the replacement part at the time of performing a periodic inspection that is performed before a life prediction time point at which the first part is expected to reach the end of its life. The processing described above can reduce the number of parts in stock and shorten a period of storage in the parts warehouse. As a result, it is possible to surely perform smooth maintenance service.

Moreover, according to the present embodiment, when the replacement parts arrive at the implementation site of the periodic inspection, the stock management unit receives arrival information and the number of the replacement parts having arrived, the arrival information indicating arrival of the replacement parts, and reflects the arrival information and the number in stock information on the first part. In addition, when replacement work of replacing the first part with the replacement part is completed, the stock management unit receives completion information and usage information on the first part, and reflects the completion information and the usage information in the stock information, the completion information indicating completion of the replacement of the first part with the replacement part. Furthermore, when the determination unit determines that it is necessary to replace the first part with the new replacement part within the period in which the periodic inspection is performed, the parts replacement instruction unit generates and outputs instruction information for replacing the first part with the replacement part. As a result of the processing described above, it is possible to surely perform smooth maintenance service.

In addition, according to the present embodiment, the data management unit calculates the average life of a plurality of the parts of the same type by using the life information, and when there is a difference between a life of the first part and the average life as a result of comparison of the life of the first part with the average life, the data management unit generates and outputs difference information indicating the difference. As a result, it is possible to determine an anomaly in a part during regular work separated from inspection work, so that it is possible to prevent an unexpected failure.

Note that the configuration illustrated in the above embodiment shows an example of the subject matter of the present invention, and it is possible to combine the configuration with another technique that is publicly known, and is also possible to omit or change part of the configuration without departing from the scope of the present invention.

For example, in FIGS. 1 and 2, constituent elements up to the data processing unit 2 are installed on the car 5, and the data management unit 11 and the subsequent units are placed in the maintenance management ground system 100. However, the configuration of the present invention is not limited to this configuration. These components may be placed on either the car or the ground as long as information can be exchanged.

In addition, the maintenance management system for railroad cars has been described in the present specification. However, it goes without saying that the present invention can be applied not only to railroad cars, but also to various related fields.

REFERENCE SIGNS LIST 1 detector; 2 data processing unit; 3 transmission processing unit; 5 car; 10 server apparatus; 11 data management unit; 12 determination unit; 13 order placement processing unit; 14, 15, 16 terminal device; 20 parts replacement instruction unit; 30 stock management unit; 31 parts warehouse; 50 train car system; 61 management department; 62 materials department; 63 maintenance department; 100 maintenance management ground system; 101 arithmetic device; 102 storage device; 103 display device; 104 input device; 105 communication interface.

The invention claimed is:

1. A maintenance management ground system comprising:
a data processor configured to generate life information on consumable parts of a railroad car; and a server apparatus comprising:
  a processor to execute a program; and
  a memory to store the program which when executed by the processor, performs:
    a data management process of holding and managing the life information, the life information being information on a life of a consumable part to be installed on the railroad car;
    a determination process of receiving an input of carrying-in and carrying-out information and determining whether it is necessary to replace a first part with a new replacement part within a period in which a periodic inspection of the railroad car is performed, on a basis of the life information and the carrying-in and carrying-out information, the carrying-in and carrying-out information being information on a scheduled carrying-in date and a scheduled carrying-out date, the scheduled carrying-in date being a date on which the railroad car is to be carried into an implementation site where the periodic inspection is performed, the scheduled carrying-out date being a date on which the railroad car is to be carried out of the implementation site, the first part being expected to reach an end of life of the first part after the scheduled carrying-out date; and
    an order placement process for the replacement part on the basis of a result of determination made by the determination process, the life information, and delivery time estimate information, the delivery time estimate information estimating a delivery time of the replacement part, and wherein the order placement process performs order placement processing for the replacement part so as to enable replacement of the first part with the replacement part at a time of performing the periodic inspection that is performed before a life prediction time point at which the first part is expected to reach the end of life of first part, and wherein when there is another part expected to reach an end of life thereof later than the first part, the other part having an estimated delivery time short enough to be replaceable during either the periodic inspection or a next periodic inspection following the periodic inspection, the order placement process performs order placement processing for replacement of the other part at a time of the next periodic inspection.

2. The maintenance management ground system according to claim 1, wherein the program further performs a stock management process of receiving arrival information and a number of the replacement parts having arrived, the arrival information indicating arrival of the replacement parts, and reflect the arrival information and the number in stock information on the first part when the replacement parts arrive at the implementation site.

3. The maintenance management ground system according to claim 2, wherein
  when replacement work of replacing the first part with the replacement part is completed, the stock management process receives completion information and usage information on the first part, and reflects the completion information and the usage information in the stock information, the completion information indicating completion of the replacement of the first part with the replacement part.

4. The maintenance management ground system according to claim 1, wherein the program further performs a parts replacement instruction process of generating and outputting instruction information for replacing the first part with the replacement part when the determination process determines that it is necessary to replace the first part with the new replacement part within the period in which the periodic inspection is performed.

5. The maintenance management ground system according to claim 1, wherein
  the data management process calculates an average life of a plurality of consumable parts of the same type as the consumable part by using the life information, and when there is a difference between a life of the first part and the average life as a result of comparison of the life of the first part with the average life, the data management process generates and outputs difference information indicating the difference.

6. A maintenance management system comprising:
  the maintenance management ground system according to claim 1; and
  a train car system to transmit the life information from the data processor to the server apparatus of the maintenance management ground system.

7. The maintenance management system according to claim 6, wherein
  the train car system transmits, as the life information, information on an estimated life of the first part to the server apparatus of the maintenance management ground system.

8. The maintenance management system according to claim 6, wherein the train car system is configured to collect information on one or more consumable parts on the railroad car, output the collect information to the data processor, and generate the life information on the one or more consumable parts on the railroad car.

9. The maintenance management system according to claim 8, wherein the train car system is further configured to calculate remaining life for each of the one or more consumable parts on the railroad car, aggregate the life information for each of the one or more consumable parts on the railroad car, and transmit aggregated life information on the each of the one or more consumable parts on the railroad car to the maintenance management ground system.

10. The maintenance management ground system according to claim 1, wherein the replacement of the first part with the replacement part is scheduled to be performed during either a next periodic inspection or a periodic inspection after the next periodic inspection.

11. The maintenance management ground system according to claim 10, wherein the order placement process for the replacement part is performed such that the replacement work is performed at the time of the periodic inspection after next periodic inspect to enable the order placement process for the replacement part so that first part can be used for a longer time within a lifetime of the first part.

12. The maintenance management ground system according to claim 1, wherein the consumable part to be installed on the railroad car comprises a plurality of consumable parts, and wherein the plurality of consumable parts are selected from one or more of brake shoes, rubber packings, bearings, air filters, oil filters, and insulators.

13. The maintenance management ground system according to claim 1, wherein the railroad car comprises a plurality of railroad cars, and wherein the determination process is configured to receive the life information from each of the plurality of railroad cars.

14. The maintenance management ground system according to claim 13, wherein the consumable part to be installed on each of the plurality of railroad cars comprises a plurality of consumable parts.

15. The maintenance management ground system according to claim 14, wherein the plurality of consumable parts are selected from one or more of brake shoes, rubber packings, bearings, air filters, oil filters, and insulators.

16. The maintenance management ground system according to claim 1, wherein
   the consumable parts of the railroad are selected from one or more of brake shoes, rubber packings, bearings, air filters, oil filters, and insulators.

\* \* \* \* \*